(12) United States Patent
Philip et al.

(10) Patent No.: US 12,277,200 B2
(45) Date of Patent: Apr. 15, 2025

(54) FAIL-SAFE SOFTWARE ACCESS LICENSING CONTROL ON A PER PROJECT BASIS WITHOUT A PRIORI KNOWLEDGE OF PROJECT DETAILS

(71) Applicant: Synopsys, Inc., Mountain View, CA (US)

(72) Inventors: Mathew V. Philip, Palo Alto, CA (US); Joseph R. Walston, Durham, NC (US); Stylianos Diamantidis, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 153 days.

(21) Appl. No.: 17/832,204

(22) Filed: Jun. 3, 2022

(65) Prior Publication Data

US 2022/0391477 A1   Dec. 8, 2022

Related U.S. Application Data

(60) Provisional application No. 63/197,144, filed on Jun. 4, 2021.

(51) Int. Cl.
*G06F 21/12* (2013.01)
(52) U.S. Cl.
CPC .................... *G06F 21/121* (2013.01)

(58) Field of Classification Search
CPC .............................. G06F 21/12; G06F 21/121
See application file for complete search history.

(56) References Cited

U.S. PATENT DOCUMENTS

| | | | | |
|---|---|---|---|---|
| 9,471,285 | B1* | 10/2016 | Koohgoli | G06F 8/751 |
| 2008/0201713 | A1* | 8/2008 | Chaffee | G06Q 10/06 |
| | | | | 718/103 |
| 2014/0189102 | A1* | 7/2014 | Fruchtman | G06F 21/105 |
| | | | | 709/224 |
| 2016/0110528 | A1* | 4/2016 | Gupta | H04L 63/08 |
| | | | | 726/19 |
| 2018/0373507 | A1* | 12/2018 | Mizrahi | G06F 18/24 |
| 2020/0387584 | A1* | 12/2020 | Gaber | G06F 11/3419 |
| 2023/0281486 | A1* | 9/2023 | Varro | G06F 30/27 |
| | | | | 706/11 |

* cited by examiner

*Primary Examiner* — Dao Q Ho
(74) *Attorney, Agent, or Firm* — Park, Vaughan, Fleming & Dowler LLP; Laxman Sahasrabuddhe (57) ABSTRACT

A request may be received to use a software on a first project. A first set of values may be extracted for a set of features of the first project. A classifier may be used to classify the first project based on the first set of values. It may be determined whether to grant the request to use the software on the first project based on an output of the classifier.

17 Claims, 7 Drawing Sheets

FAIL-SAFE SOFTWARE ACCESS LICENSING CONTROL ON A PER PROJECT BASIS WITHOUT A PRIORI KNOWLEDGE OF PROJECT DETAILS

RELATED APPLICATION

This application claims the benefit of U.S. Provisional Application Ser. No. 63/197,144, filed on 4 Jun. 2021, the contents of which are herein incorporated by reference in their entirety for all purposes.

TECHNICAL FIELD

The present disclosure generally relates to an electronic design automation (EDA) system. More specifically, the present disclosure relates to a system and method for providing fail-safe software access licensing control on a per-project basis without a priori knowledge of project details.

BACKGROUND

Controlled access to software (e.g., EDA software) may be provided through tokenized licenses, where each token may allow a single instance of the software to be used at any given time. In these licensing approaches, the number of available tokens may limit the number of times or instances that a software is used.

SUMMARY

Embodiments described herein may provide techniques and systems for granting software access based on a per-project basis. A request may be received to use a software on a first project. A first set of values may be extracted for a set of features of the first project. A classifier may be used to classify the first project based on the first set of values. It may be determined whether to grant the request to use the software on the first project based on an output of the classifier. A classifier may be implemented using instructions stored on a storage medium, which may be executed by a processor.

In some embodiments described herein, prior to receiving the request to use the software on the first project, multiple sets of values may be extracted for the set of features of a second project when the software is used on the second project. Next, the classifier may be trained using the multiple sets of values for the set of features. Training the classifier may be performed online, i.e., the classifier may continue to be trained while the classifier is used for classifying projects.

In some embodiments described herein, training the classifier using the multiple sets of values for the set of features may include constructing probability distribution functions for the set of features based on the multiple sets of values. In these embodiments, using the classifier to classify the first project based on the first set of values may include computing a set of probabilities based on the probability distribution functions and the first set of values, and classifying the first project based on the set of probabilities.

In some embodiments described herein, training the classifier using the multiple sets of values for the set of features may include storing the multiple sets of values as vectors of a multidimensional feature space. In these embodiments, using the classifier to classify the first project based on the first set of values may include determining k-nearest neighbors of a first vector corresponding to the first set of values in the multidimensional feature space, and classifying the first project based on the k-nearest neighbors.

In some embodiments described herein, the software may be allowed to be used on the first project even though it is determined to not grant the request to use the software on the first project. In these embodiments, the output of the software may be encrypted and the request to use the software on the first project may be forwarded to an arbiter. Upon receiving a response from the arbiter to grant the request to use the software on the first project, the output of the software may be decrypted and the request to use the software on the first project may be granted.

BRIEF DESCRIPTION OF THE FIGURES

The disclosure can be understood based on the detailed description given below and the accompanying figures. The figures, examples and embodiments are for illustrative purposes, and do not limit the scope of the disclosure. Furthermore, the figures are not necessarily drawn to scale.

DETAILED DESCRIPTION

It may be desirable to enable software access based on a specific entity (such as a design or a project) on which the software is used. In this disclosure, such a specific entity may be referred to a "subject," "project," or "intellectual property (IP)." These terms may be used interchangeably and generally refer to data on which a licensed software application is desired to be used. For example, in the context of an integrated circuit (IC) design project, the set of files that define the IC design may be referred to as the "subject," "project," or "IP."

A subject-level or project-level access control model may be a better fit for both customers and software vendors. This model may allow better value capture by allowing a vendor to price a software package based on the value add it brings to the complexity of a given project. For a customer, the benefits include being able to pay a defined price for a specific software functionality required for a project rather than a flat fee encompassing all features regardless of whether the features are required.

In this context, a project may signify a highly connected and/or correlated representative intent that changes over time. Examples of projects include, but are not limited to, an IC design. An IC design typically changes over time as the IC design progresses through an IC design flow.

Although a project may change over time, the project may have defining characteristics that distinguish it from other projects. Specifically, one or more feature values may be used to distinguish between projects. The features may be predefined but generic enough so that the features exist for all projects in a given domain. For example, the feature "project name" may exist for all IC designs. The features may be numerical or textual.

In some embodiments described herein, the features may have definable ranges so that a distance metric may be computed between two feature values. For example, in the domain of IC designs, "instance count" is a numeric characteristic with limits that allows us to identify a particular IC design. "design name" or "project name" is another feature with textual type. The value of an feature may change over time, e.g., the "instance count" of an IC design may change over time as the IC design is modified to satisfy various design requirements.

In this disclosure, the term "feature" may refer to a characteristic of a project, and the term "feature value" may refer to a specific value of the feature for a given project. For example, the feature "project name" may have the value "CPU" for a first IC design and the value "GPU" for a second IC design. Likewise, for a numerical feature such as "instance count," the value may be 1,000,337 for the first IC design, and the value may be 577,553 for the second IC design.

Figure 1:
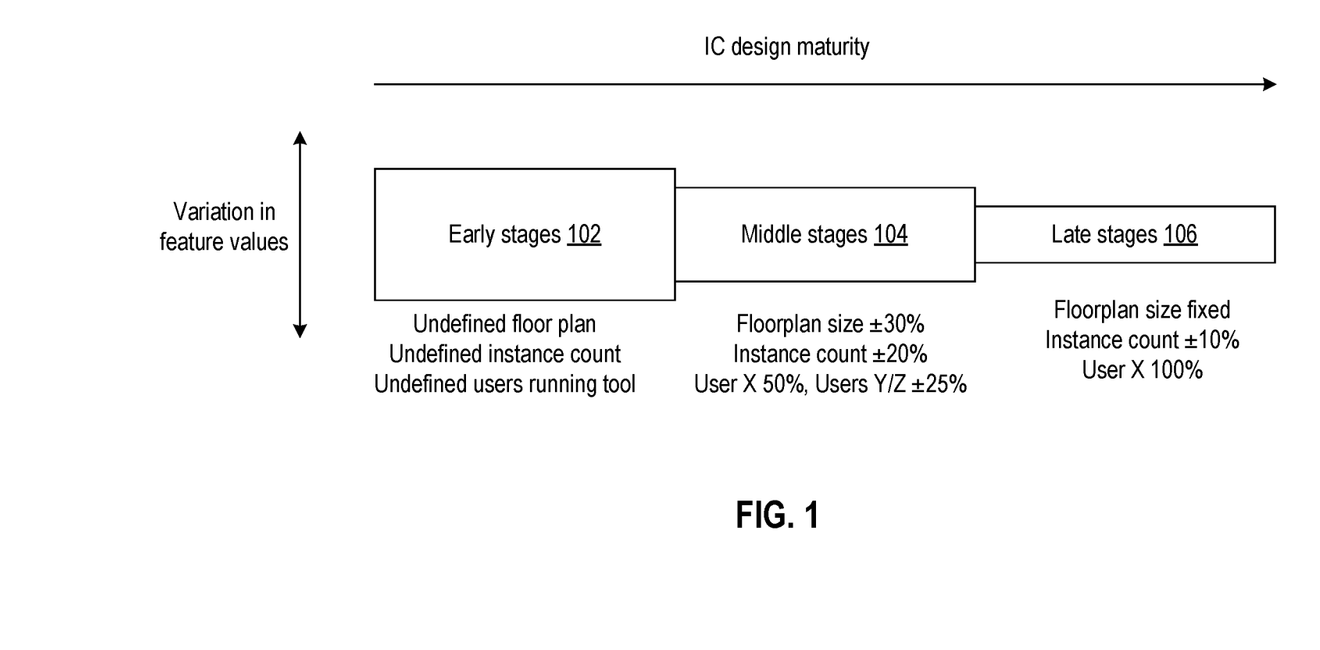
FIG. 1 illustrates progression of an IC design project over time in accordance with some embodiments described herein.

FIG. 1 illustrates progression of an IC design project over time in accordance with some embodiments described herein. The X-axis corresponds to the IC design maturity, and the Y-axis corresponds to the variation in the feature values.

The IC design may progress through early stages 102, middle stages 104, and late stages 106 as the IC design matures over time. For example, an IC design may be associated with revision numbers (e.g., 0.1 through 1.0) as the IC design matures over time. An IC design may be fully mature after the IC design satisfies all constraints and performance targets and is ready to be handed over for manufacturing. In some embodiments, earlier revisions (e.g., revisions 0.1-0.3), may not pass through the complete IC design flow, whereas middle and later stages (e.g., revisions 0.4-1.0) may pass through the complete IC design flow. However, in other embodiments, all revisions may pass through the complete IC design flow. As the IC design matures (which may include the IC design passing through the entire IC design flow one or more times), the variations in feature values may decrease progressively. For example, in early stages 102, the limits of a domain specific list of features of a project may be unknown or entirely non-existent early in a design flow and constant manual refinement may need to be made to the limits as the project progresses. In middle stages 104, variation in the floorplan size, instance count, and application usage by user may be known and may fall within the bounds shown in FIG. 1. In later stages 106, the variation range may further tighten as shown in FIG. 1. The variation ranges for features may be sufficiently large to enable continued use of the software application as the project is modified, but the variation ranges may not be so broad that it allows non-licensed designs or projects to run.

Embodiments described herein allow for the enablement of software licensing on a per-project basis (as opposed to a per-use or per-instance basis). Specifically, some embodiments described herein utilize unsupervised data collection, machine learning based analysis, and provide a fail-safe system that allows a vendor to license a software product on a per-project basis. Some embodiments described herein provide a software licensing system that is based on a machine learning classification system, and that can be used for project-based licensing in situations where projects do not have fixed, objective data with which to identify them.

Some embodiments described herein provide a fail-safe mode of operation, in which all licensed software operations may be enabled however any output data such as a saved database may be encrypted, and diagnostic data may be generated for the software vendor to analyze. The encrypted output can be re-enabled by contacting vendor support and sending the diagnostic data. The diagnostic data can help the vendor ascertain if the failure in detection is legitimate and thus warrants updates to the classification system or requires further discussion with the customer.

Benefits of embodiments described herein include, but are not limited to, (1) anticipating that a project will be refined over time, (2) not requiring generic limits, (3) not requiring manual tuning of limits as the project progresses, and (4) providing a fail-safe mode of operation that avoids downtime for customer use scenarios if the system fails to detect unknown variations in a project.

Software licensing models allow a software vendor to monetize and protect software by enabling access based on licensed use cases. For example, if a customer and vendor enter into a floating license agreement with a specific number of licenses as part of the agreement, the customer may access up to the fixed number of licenses that were agreed upon. Embodiments described herein may be used for licensing of features in a software package or general restrictions that are of an environmental nature such as a time period or geographical restriction.

Embodiments described herein feature a machine learning classification system that may collect features of a project and build a classifier that can match the project with other versions of the project with a degree of uncertainty on a per-feature basis that matches the variability of that feature in the classifier.

As a project matures, and the classification system is exposed to more sets of features extracted from the project, the per-feature uncertainty may reduce, leading to a classification system that becomes more accurate over time. The certification of the software license through the project-based licensing system may be determined based on matching or classifying the current state of the IP using the classification system.

The specific features that are collected may be specific to the software application that is being licensed and can be determined either in a supervised manner by domain experts or unsupervised manner using machine-learning feature extraction techniques which include, but are not limited to, principal component analysis (PCA) and correlation coefficients. As an example, in EDA software licensing, the features could be aspects of the technology (e.g., metal stack, process corner), library (e.g., cell families, drive strengths), logical design (e.g., port count, register count, number of nets), physical design (e.g., block size, average cell utilization, number of voltage domains), constraints (e.g., clocks, multi-corner multi-mode scenarios, highest frequency).

For each of these features, values may be collected by the system each time the feature is generated by the licensed software. These features, collected over time, may lead to a distribution of values for a given unit of IP. Each feature distribution may be represented as a single probability distribution function (PDF) for a given feature for a particular IP unit. Features collected from an IP in future software invocations may be checked against the feature PDFs and return match probabilities based on the IP feature distributions. For example, if the IP feature distributions are assumed to be normally distributed, then the match probability for a specific IP feature may be computed based mean and standard deviation of the IP feature PDF.

In some embodiments described herein, the IP feature PDFs may be used to classify IP projects. Specifically, a joint probability distribution may be created for a set of IP features based on extracted IP feature values. For example, if the probability distributions of individual features are independent of each other, then a joint probability distribution may be created by multiplying the individual probability distributions. Next, the joint probability distribution may be used to compute a probability value for a given set of IP feature values. The probability value may then be compared with a threshold to determine whether the IP project is classified as the same IP project or a different IP project.

In some embodiments described herein, each IP feature PDF may be treated as a separate classifier which generates a classification output. Specifically, a feature value of an IP project may be used to determine the probability that this feature value belongs to the same project. The probability value may then be compared with a threshold to generate the classification output. In some embodiments described herein, the classification output may be binary, e.g., a zero value if the probability value is below the threshold and a one value if the probability is above the threshold. In other embodiments, the classification output may be a continuous value, e.g., the probability value may be outputted as the classification output. The classifiers of the different IP features may be combined using an ensemble of classifiers, which may allow for a certain degree of failures while still returning a positive match, thus producing a classification system that allows for some features to have significant change if the majority stay within a given tolerance of the feature PDFs.

In some embodiments, the same set of features may exist for all projects. However, in other embodiments, mirror differences in features may exist across different projects. In these embodiments, the classifier may be used for all design projects, regardless of whether there exist design-dependent features. For example, a first project may contain circuitry that implements bespoke features (e.g., multiple power domains and power management cells), whereas a second project may not include such circuitry (e.g., the second project may include a single power domain and may not include any power management cells). In these embodiments, the disparate feature sets of different projects may be used in the classification process.

When a new project is started, no extracted IP features may exist in the classification engine, and thus no classifiers may be available. The first invocation of the software with a new project may initialize the feature PDFs and begin the feature collection process to generate the classifiers. The first invocation may not cause the system to perform a classification. Instead, the first invocation may cause the license to be granted in a provisional mode (i.e., pending manual approval later), or may require a vendor-issued new project key. As the software is used to work on the project, and additional feature data is generated, the number of data points in the PDFs may increase. The threshold at which the PDFs may be used for classification may be data dependent. In other words, the PDF for a feature may not be used until at least a threshold number of data points for the feature have been collected. In some embodiments described herein, the threshold may be set to four or five data points per feature.

In some embodiments, the threshold may be an empirical setting or may be based on the standard measure for uncertainty in an event counting process (e.g., $1/\sqrt{n}$ where n is the number of events), where PDF-based classification and validation may begin after a measure of uncertainty is below a threshold of uncertainty.

The project-based licensing system disclosed herein may track the evolution of the licensed project IP and restricts the IP characteristics to obtain a license based on this evolution. Embodiments described herein enable the project-based license to automatically adapt to IP maturation that may change in time, without users having to manually track or specify the features that ultimately determine the fundamental characteristic of the licensed IP.

Figure 2:
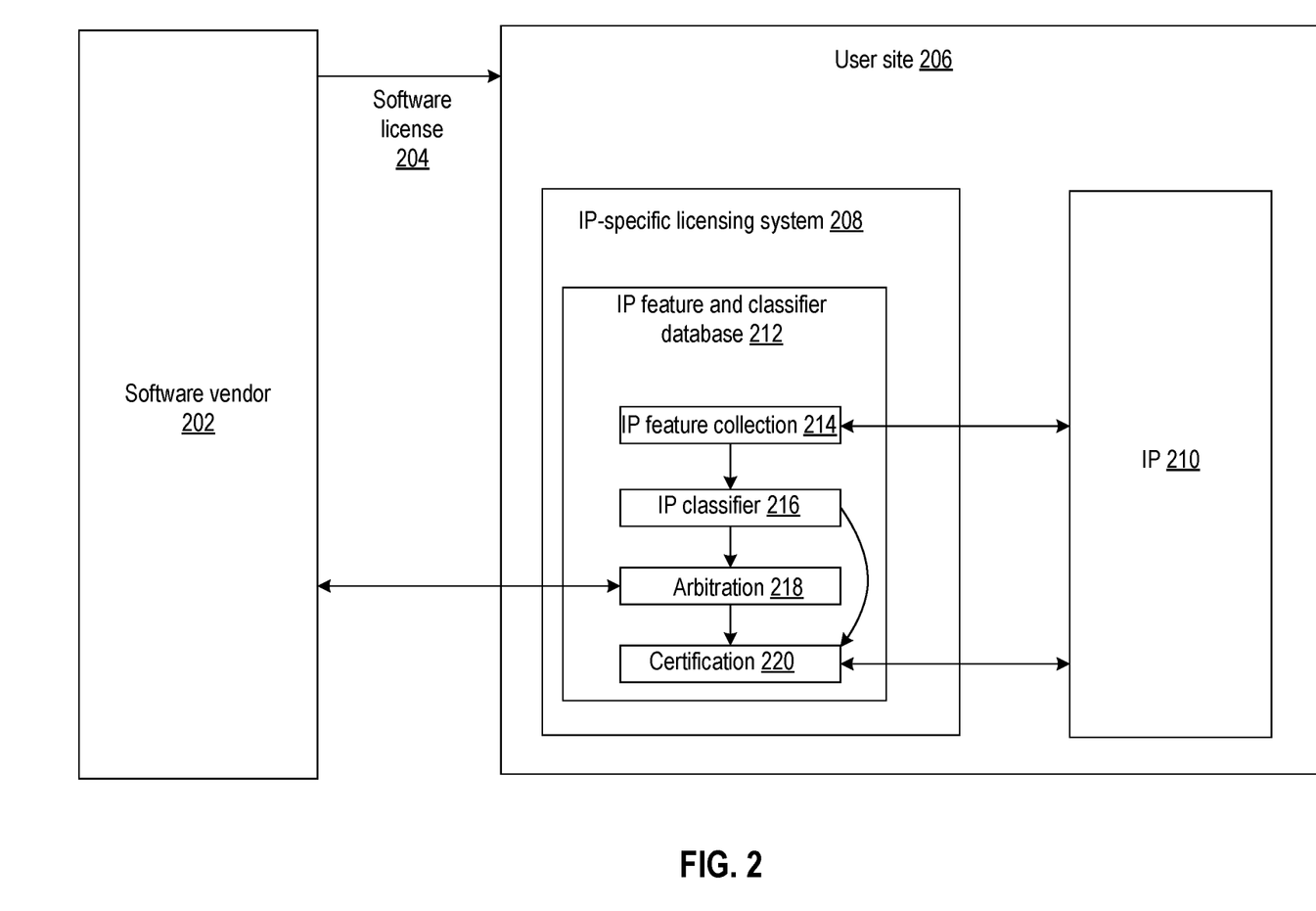
FIG. 2 illustrates a licensing system in accordance with some embodiments described herein.

FIG. 2 illustrates a licensing system in accordance with some embodiments described herein.

Software vendor 202 may provide software license 204 to use the licensed software at user site 206. IP-specific licensing system 208 may be used to ensure that the licensed software is used at user site 206 for only those IP projects (i.e., IP design project) for which software license 204 was granted.

Specifically, IP-specific licensing system 208 may include IP feature and classifier database 212 which may include IP feature collection module 214, IP classifier 216, arbitration module 218, and certification module 220. A module or an engine may be implemented by a processor which executes instructions stored on a storage medium. When the licensed software is used on IP 210 (i.e., an IC design project), IP-specific licensing system may decide whether the licensed software is allowed to be used on IP 210. Specifically, IP feature collection module 214 may extract features from IP 210 and provided the extracted features to IP classifier 216. IP classifier 216 may determine if the extracted features indicate that IP 210 is the same project for which the licensed software is authorized to be used. If so, IP classifier 216 may cause certification module 220 to allow the licensed software to access IP 210. On the other hand, if the extracted features indicate that IP 210 is not the same project for which the licensed software is authorized to be used, IP classifier 216 may cause arbitration module 218 to enable software vendor 202 to review the extracted features and certify the use of the licensed software on IP 210. Arbitration module 218 may provide the result of the arbitration process to certification module 220, which may either allow or deny the licensed software to be used on IP 210.

In some embodiments described herein, a user at user site 206 may create a new project in the licensed software system, which may cause the licensed system to be used for the first time for the new project. Upon startup, the licensed software may communicate with IP-specific licensing system 208 to create an entry in a local certification database (which may be maintained by certification module 220) for the new project (which may consume a project key or token from a finite pool of project keys that have been provisioned at user site 206 as a part of the software purchase business model). Initially, IP feature and classifier database 212 may contain the initial set of features that were extracted at project creation. As the licensed software continues to run, IP-specific licensing system 208 may collect features of the project at multiple time instances and build a set of feature snapshots over time.

When a certain number (e.g., minimum threshold) of features has been collected by IP feature collection module 214, IP-specific licensing system 208 may build IP classifier 216 based on the feature data collected for the project. For example, IP classifier 216 may use the collected feature data and build an ML classification model that represents the statistical distribution of collected feature values that have been collected to date. Once the IP classifier 216 has met a minimum data volume for validity, the licensed software may operate on the project if the IP in use passes a classification check to within the statistical tolerances calculated to date.

In some embodiments described herein, the ML classification model may construct a joint probability distribution of the set of features based on the collected feature values. Next, given a specific set of feature values, the ML classification model may determine the probability corresponding to the specific set of feature values. If the determined probability is above a classification threshold, then the ML classification model may classify the project as the same project for which the joint probability distribution was created. On the other hand, if the determined probability is below the classification threshold, then the ML classification model may classify the project as a different project. In some embodiments, a range of allowed values may be determined for each feature in the set of features based on the probability distribution of the feature. For example, the range of values for a given feature may be $\mu \pm \alpha \cdot \sigma$, where $\mu$ is an average value for the feature, $\alpha$ is an empirical constant, and $\sigma$ is the standard deviation for the feature. Next, the ML classification model may classify a given project depending on whether each feature value for the given project is within the range of allowed values.

In some embodiments, a k-nearest neighbor technique may be used for classification. The extracted features may be represented as vectors in a multidimensional feature space and each vector may be labeled as the project while sufficient training data is being collected. Thus, in the training phase the extracted features may be stored and may be classified as belonging to the same project. In other words, the multidimensional feature space may be viewed as having multiple vectors, where each vector may be labeled with the project name or project identifier corresponding to the vector. Given a vector or point in the multidimensional feature space, a query may be performed to determine the k-closest or k-nearest vectors to the given vector or point.

In the classification phase (e.g., when IP classifier 216 is used for classifying projects), an unlabeled vector (e.g., a set of features extracted from a project) is classified by assigning the label which is most frequent among the k samples nearest to the unlabeled vector. The value k may a user-defined constant. For continuous feature values, the Euclidean distance metric may be used. For discrete feature value, such as for text, an overlap metric or Hamming distance metric may be used to determine distance.

In some embodiments, if the extracted features indicate that IP 210 is not the same project for which the licensed software is authorized to be used, IP classifier 216 may allow the licensed software to be run in a provisional mode where the licensed software runs as usual, but the output is encrypted. Once software vendor 202 certifies the use of the licensed software on IP 210, the encrypted output may be decrypted.

In some embodiments described herein, if an IP project fails a classification check (i.e., the IP project is classified as being a different project), the user may have three options: 1) initiate a new project in the certification system (used when a new project is created), 2) request arbitration for a classification failure on existing project IP (likely involving human arbitration from the software vendor) or 3) allow the software to complete in provisional mode and use the unencrypted output (which may be limited to only certain types of output data) to preview the software's actions (akin to a "demo mode"). Specifically, some output may be encrypted, and some output may be provided in unencrypted form to the user to allow the user to decide whether the user wants to unlock the encrypted output.

Some embodiments described herein may provide an optional capability which can provide post-completion certification for IP which was either initially uncertified, or resulted in an arbitration request that resulted in certification arriving late. In this case, the software may be run in a provisional mode, and the outputs may be encrypted, and the newly arriving certification may be used to decrypt the software output, thereby eliminating the need to run the software again.

Figure 3:
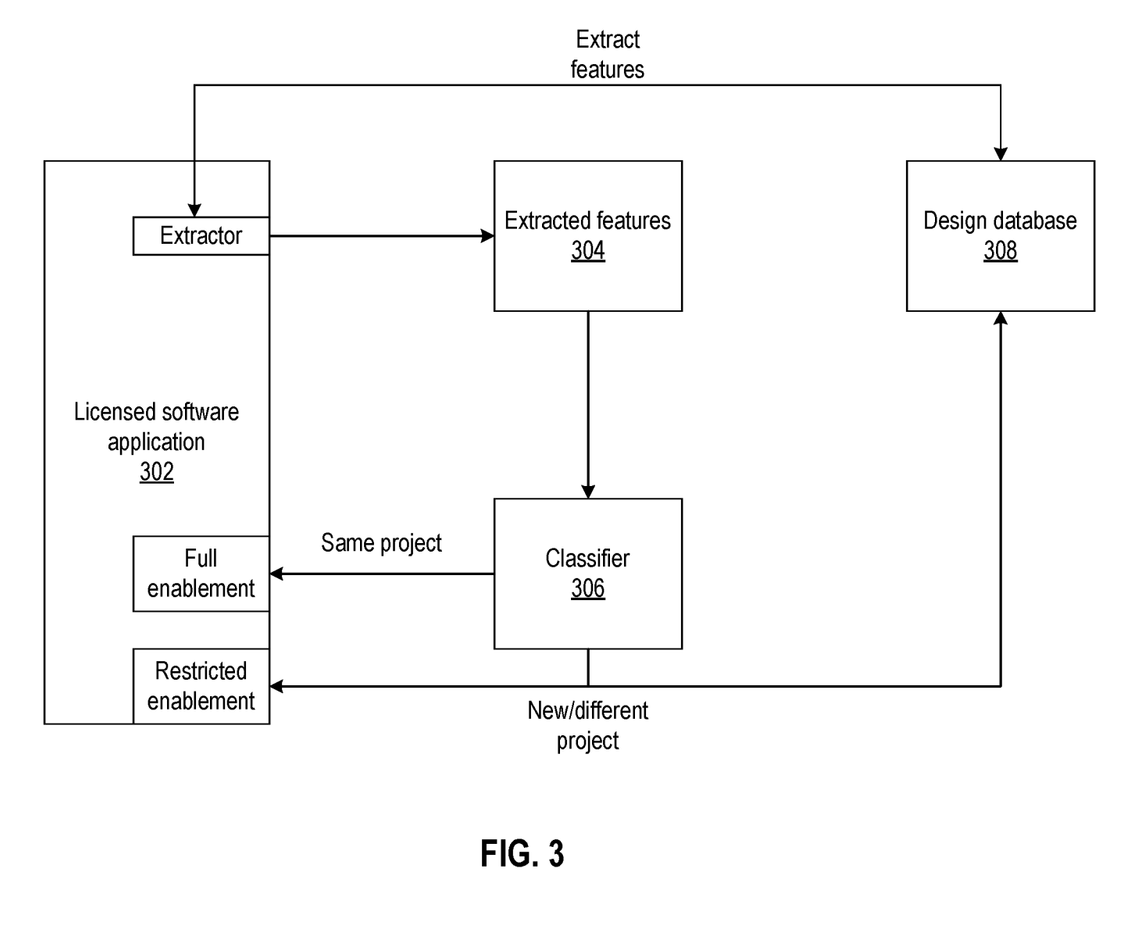
FIG. 3 illustrates data flow in an implementation of an IP-specific licensing system in accordance with some embodiments described herein.

FIG. 3 illustrates data flow in an implementation of an IP-specific licensing system in accordance with some embodiments described herein.

Licensed software application 302 may include an extractor component which may collect or extract features from design database 308 which may contain the IP project. A component may be implemented by a processor which executes instructions stored on a storage medium. Extracted features 304 may then be provided to classifier 306 (which may be implemented by a processor executing instructions stored on a storage medium). Classifier 306 may validate the project. If classifier 306 classifies the project as the same project, then licensed software application 302 may provide full enablement of software capabilities. On the other hand, if classifier 306 classifies the project as a new or different project, then licensed software application 302 may provide restricted enablement of software capabilities and a new entry may be created in design database 308.

Figure 4:
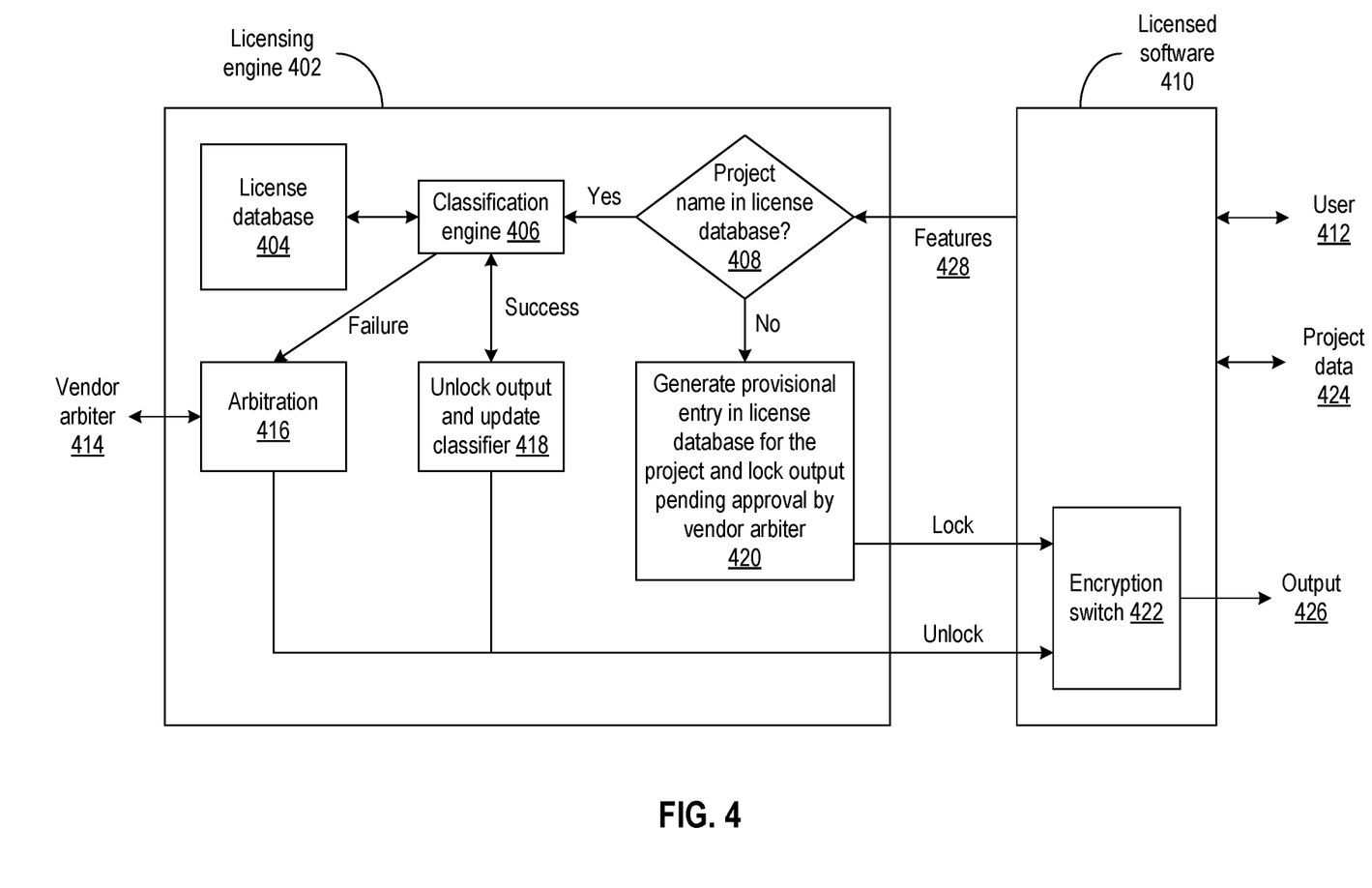
FIG. 4 illustrates a process for IP-specific licensing system in accordance with some embodiments described herein.

FIG. 4 illustrates a process for IP-specific licensing system in accordance with some embodiments described herein.

User 412 may invoke licensed software 410 (e.g., an EDA software application) to work on project data 424 (e.g., an IC design). Licensed software 410 may collect features 428 (e.g., feature values F0, F1, F2, . . . , Fn) from project data 424 and provide features 428 to licensing engine 402. An engine (e.g., licensing engine 402, classification engine 406, etc.) may be implemented by a processor which executes instructions stored on a storage medium (e.g., a memory device). Specifically, one of the collected features may include a project name (or project identifier). Licensing engine 402 may check if the project name is in license database 404 (at 408). If the project name is in license database 404 ("Yes" branch from 408) and sufficient classification data exists for the project, features 428 may be provided to classification engine 406. On the other hand, if the project name is not in license database 404 ("No" branch from 408), then a provisional entry for the project may be generated in license database 404 and encryption switch 422 may be instructed to lock output 426 pending approval by vendor arbiter 414 (at 420). Locking output 426 may include encryption switch 422 encrypting output 426, which may be decrypted once vendor arbiter 414 approves access. Encryption switch 422 may be implemented by a processor executing instructions stored on a storage medium. Encryption switch 422 may receive input data, and either output the input data as is (i.e., without any encryption) or output an encrypted version of the input data. Encryption switch 422 may determine whether to encrypt the input data based on a value stored in memory. Additionally, encryption switch 422 may decrypt data that was previously encrypted by encryption switch 422.

In some embodiments described herein, features 428, dynamically generated PDFs of the features collected so far for a project, and an ensemble match threshold (and any other thresholds that are used by classification engine 406) may be stored in license database 404. If the classification succeeds (i.e., classification engine 406 determines that licensed software 410 is authorized for use on project data 424), then the output of licensed software 410 may be unlocked and features 428 may be used to update classification engine 406 (at 418). Unlocking output 426 of licensed software 410 may include decrypting the encrypted output (which may have been generated uninterrupted while classification engine 406 was classifying the project). Updating classification engine 406 based on features 428 may include adding datapoints to feature PDFs or adding feature vectors for a k-nearest neighbor classifier. As a project matures, updating classification engine 406 may narrow the range of feature values that result in successful classification.

On the other hand, if classification fails (i.e., classification engine 406 determines that licensed software 410 is not authorized to be used on project data 424), then arbitration engine 416 may be invoked. Vendor arbiter 414 may interact with arbitration engine 416 to determine whether licensed software 410 is licensed to be used with project data 424. If vendor arbiter 414 decides to grant access to license software 410, arbitration engine 416 may instruct encryption switch 422 to unlock the output 426.

Figure 5:
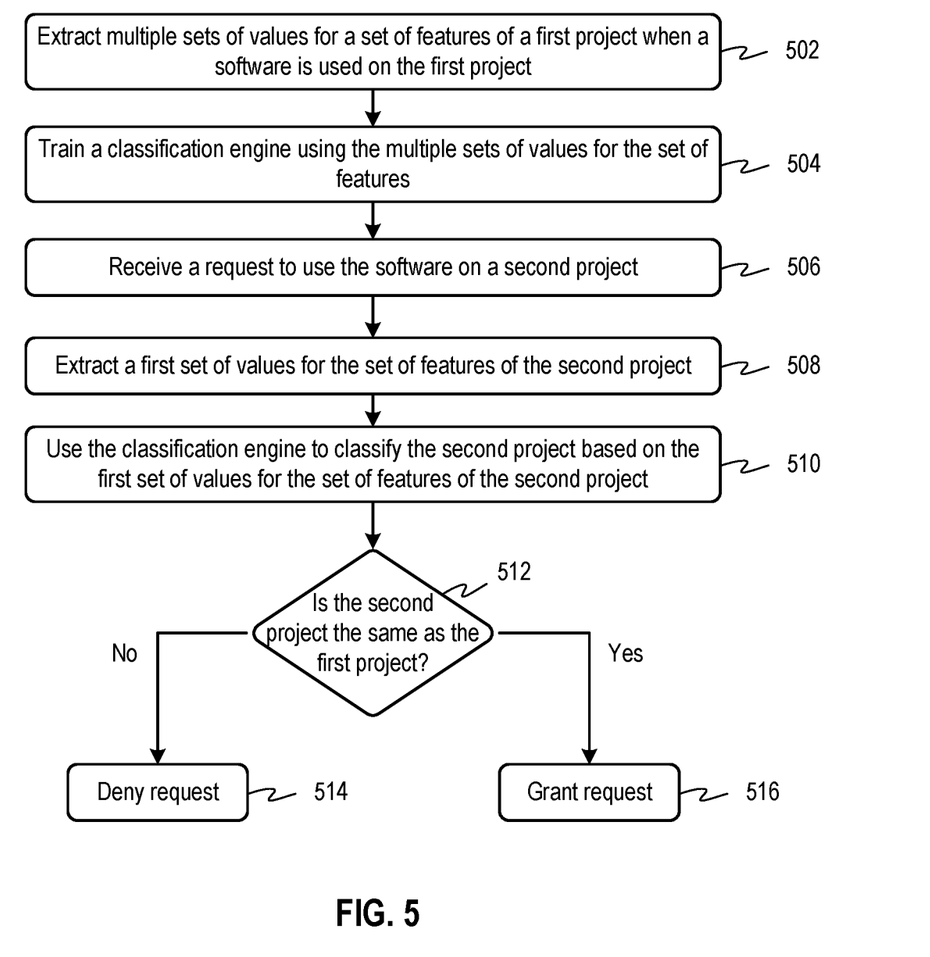
FIG. 5 illustrates a process for licensing software in accordance with some embodiments described herein.

FIG. 5 illustrates a process for licensing software in accordance with some embodiments described herein.

Multiple sets of values may be extracted for a set of features of a first project when a software is used on the first project (at 502). For example, a set of values may be extracted for each revision of the first project as the first project progresses toward maturity. A classification engine may be trained using the multiple sets of values for the set of features (at 504). In some embodiments described herein, PDFs for the set of features may be determined based on the multiple sets of values, and the PDFs may be used to construct a classifier. In some embodiments, the multiple sets of values may be stored as vectors of a multidimensional feature space, and a k-nearest neighbor technique may be used to classify projects.

A request to use the software on a second project may be received (at 506). A first set of values may be extracted for the set of features of the second project (at 508). The classification engine may be used to classify the second project based on the first set of values for the set of features of the second project (at 510).

The result of the classification may indicate whether the second project is the same as the first project (at 512). If the second project is the same as the first project, then the request for permission to use the software on the second project may be granted (at 516). For example, if the second project is a later revision of the first project, then the result of the classification may indicate that the second project is the same as the first project.

On the other hand, if the second project is not the same as the first project, then the request for permission to use the software on the second project may be denied (at 514). For example, if the second project is different from the first project (but has the same name or identifier as the first project), then the result of the classification may indicate that the second project is not the same as the first project. In some embodiments described herein, in response to determining to not grant permission to use the software on the second project, (1) the software may be allowed to be used on the second project, (2) the output of the software may be encrypted, and (3) the request to use the software on the second project may be forwarded to an arbiter. In response to receiving a response from the arbiter to grant permission to use the software on the second project, (1) the output of the software may be decrypted, and (2) permission to use the software on the second project may be granted.

Figure 6:
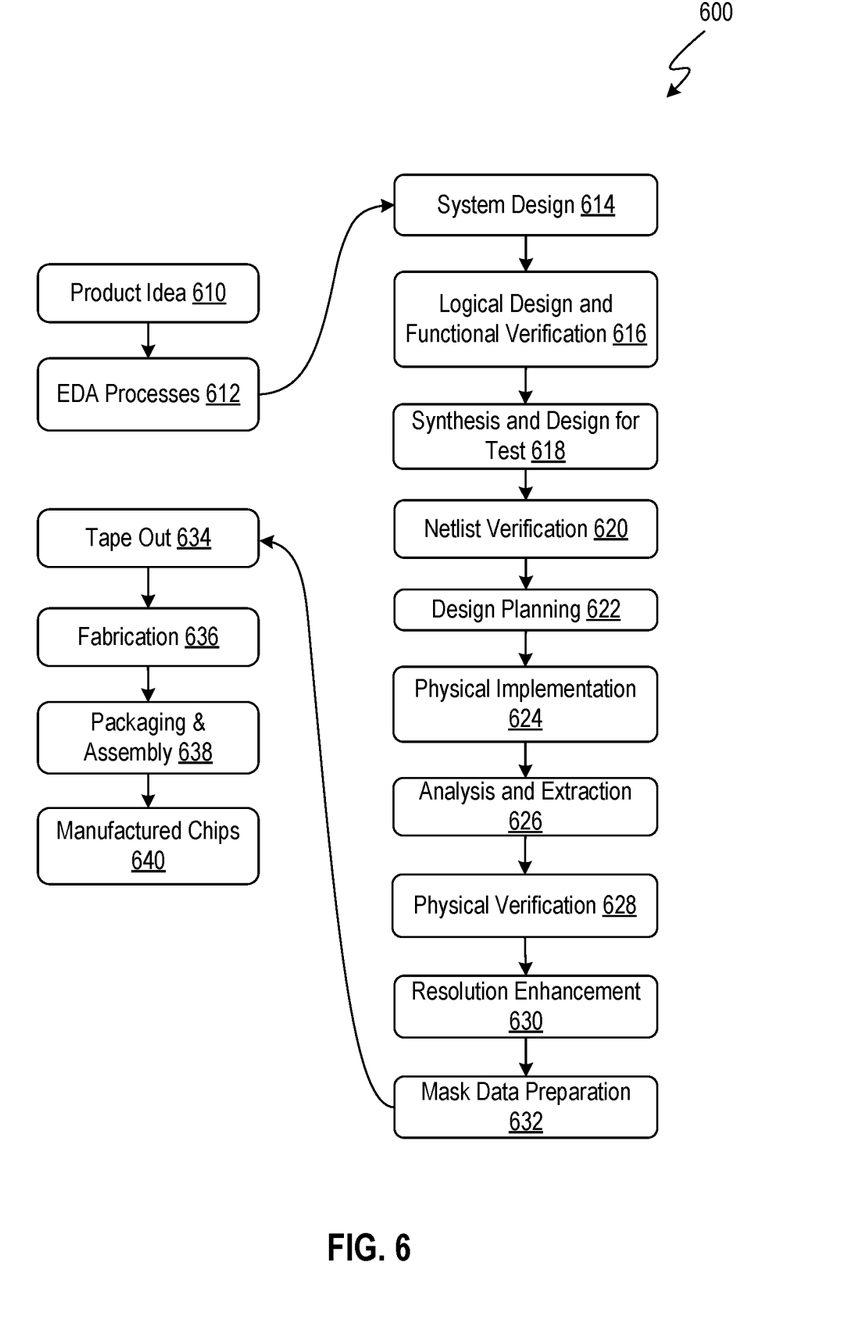
FIG. 6 illustrates an example flow for the design, verification, and fabrication of an integrated circuit in accordance with some embodiments described herein.

FIG. 6 illustrates an example flow for the design, verification, and fabrication of an integrated circuit in accordance with some embodiments described herein.

EDA processes 612 (the acronym "EDA" refers to "Electronic Design Automation") can be used to transform and verify design data and instructions that represent the integrated circuit. Each of these processes can be structured and enabled as multiple modules or operations.

Flow 600 can start with the creation of a product idea 610 with information supplied by a designer, information which is transformed and verified by using EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly 638 are performed to produce the manufactured IC chip 640.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more detailed description adds more detail into the design description. The lower levels of representation that are more detailed descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 in FIG. 7) may be used to store the programs and data structures that are used by some or all of the EDA products described herein, and products used for development of cells for the library and for physical and logical design that use the library.

Figure 7:
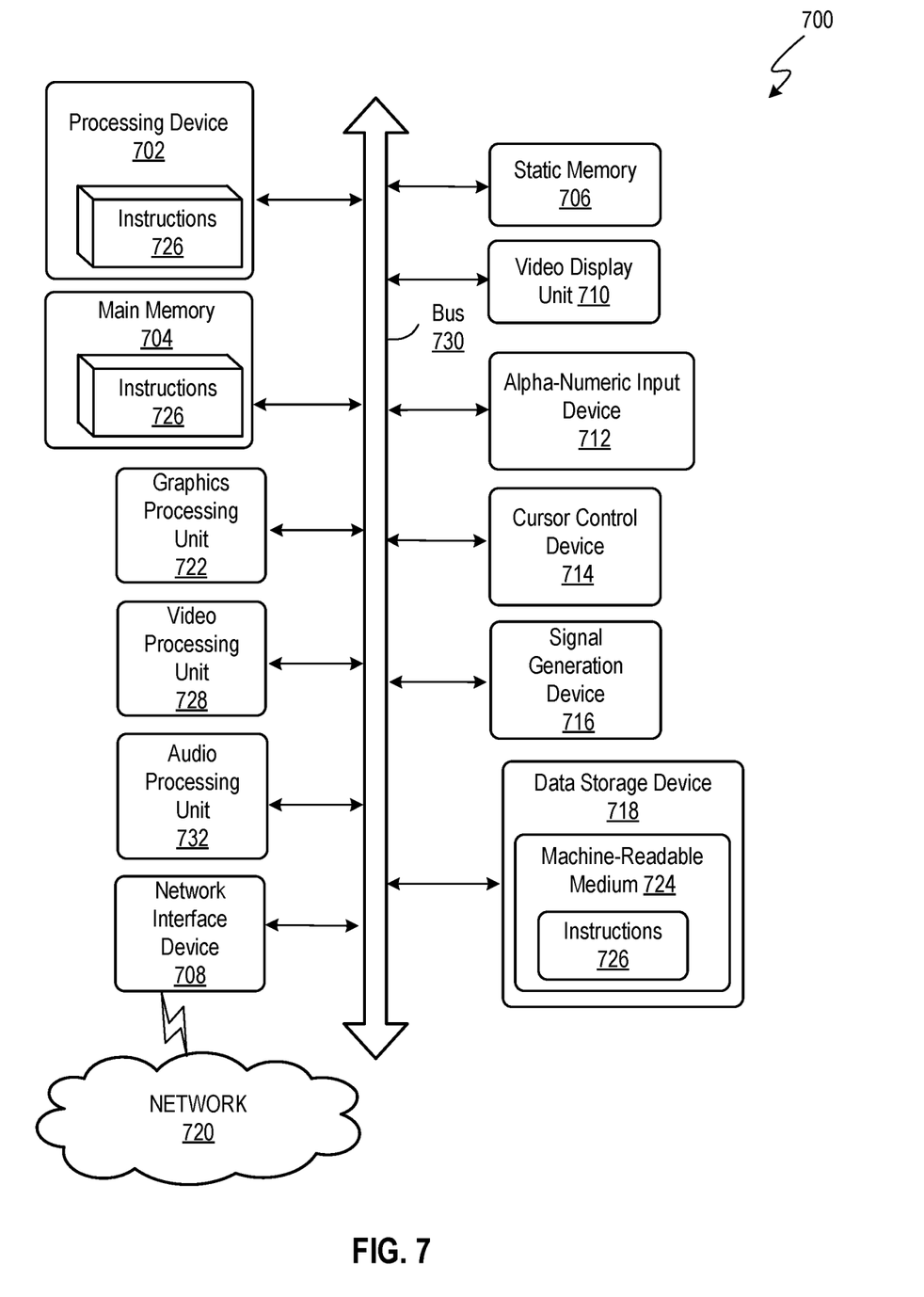
FIG. 7 illustrates an example machine of a computer system within which a set of instructions, for causing the machine to perform any one or more of the methodologies discussed herein, may be executed.

FIG. 7 illustrates an example machine of a computer system 700 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various design modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a classifier trained using a first set of values for a set of features when a software is used on a first integrated circuit (IC) design, wherein at least one value in the first set of values for at least one feature in the set of features is extracted from first data of the first IC design;
   receiving a request to use the software on a second IC design, wherein the second IC design includes second data on which the software is desired to be used;
   extracting a second set of values for a set of features of the second IC design, wherein at least one value in the second set of values for at least one feature in the set of features is extracted from second data of the second IC design on which the software is used;
   executing the classifier on a processor to classify the second IC design based on the second set of values;
   in response to the classifier determining that the second IC design is the same as the first IC design, granting the request to use the software on the second IC design; and
   in response to the classifier determining that the second IC design is not the same as the first IC design,
      allowing the software to be used on the second IC design,
      encrypting output of the software, and
      forwarding a request to decrypt the output of the software to an arbiter.

2. The method of claim 1, wherein prior to receiving the request to use the software on the second IC design, the method further comprising:
   extracting the first set of values for the set of features of the first IC design when the software is used on the first IC design; and
   training the classifier using the first set of values for the set of features.

3. The method of claim 2, wherein the training the classifier using the first set of values for the set of features comprises constructing probability distribution functions for the set of features based on the first set of values.

4. The method of claim 3, wherein the using the classifier to classify the second IC design based on the second set of values comprises:
   computing a set of probabilities based on the probability distribution functions and the second set of values; and
   classifying the second IC design based on the set of probabilities.

5. The method of claim 2, wherein training the classifier using the first set of values for the set of features comprises storing the first set of values as vectors of a multidimensional feature space.

6. The method of claim 5, wherein using the classifier to classify the second IC design based on the second set of values comprises:
   determining k-nearest neighbors of a first vector corresponding to the second set of values in the multidimensional feature space; and
   classifying the second IC design based on the k-nearest neighbors.

7. The method of claim 1, further comprising:
in response to receiving a response from the arbiter which allows decryption of the output of the software to grant the request to use the software on the first IC design, decrypt the output of the software, and
grant the request to use the software on the first IC design.

8. A non-transitory computer readable storage medium storing instructions, which when executed by a processor, cause the processor to:
extract multiple sets of values for a set of features of a first project when a software is used on the first project, wherein the first project includes data on which the software is used, and wherein at least one value in the multiple sets of values for at least one feature in the set of features is extracted from the data;
train a classifier using the multiple sets of values for the set of features; and
in response to receiving a request to use the software on a second project,
extract a first set of values for the set of features of the second project,
use the classifier to classify the second project based on the first set of values,
in response to the classifier classifying the second project to be the same as the first project, grant the request to use the software on the second project, and
in response to the classifier determining that the second project is not the same as the first project,
allowing the software to be used on the second project,
encrypting output of the software, and
forwarding a request to decrypt the output of the software to an arbiter.

9. The non-transitory computer readable storage medium of claim 8, wherein the training the classifier using the multiple sets of values for the set of features comprises constructing probability distribution functions for the set of features based on the multiple sets of values.

10. The non-transitory computer readable storage medium of claim 9, wherein the using the classifier to classify the second project based on the first set of values comprises:
computing a set of probabilities based on the probability distribution functions and the first set of values; and
classifying the second project based on the set of probabilities.

11. The non-transitory computer readable storage medium of claim 8, wherein the training the classifier using the multiple sets of values for the set of features comprises storing the multiple sets of values as vectors of a multidimensional feature space.

12. The non-transitory computer readable storage medium of claim 11, wherein the using the classifier to classify the second project based on the first set of values comprises:
determining k-nearest neighbors of a first vector corresponding to the first set of values in the multidimensional feature space; and
classifying the second project based on the k-nearest neighbors.

13. The non-transitory computer readable storage medium of claim 8 further storing instructions, which when executed by a processor, cause the processor to:
in response to receiving a response from the arbiter which allows decryption of the output of the software to grant the request to use the software on the first IC design, decrypt the output of the software, and
grant the request to use the software on the first IC design.

14. An apparatus, comprising:
a memory storing instructions; and
a processor, coupled with the memory and to execute the instructions, the instructions when executed causing the processor to:
receive a request to use a software on a second IC design, wherein the second IC design includes second data on which the software is used;
extract a second set of values for a set of features of the second IC design, wherein at least one value in the second set of values for at least one feature in the set of features is extracted from the second data;
use a classifier to classify the second IC design based on the second set of values, wherein the classifier is trained using a first set of values for the set of features when the software is used on a first IC design, and wherein at least one value in the first set of values for at least one feature in the set of features is extracted from first data of the first IC design;
in response to the classifier determining that the second IC design is the same as the first IC design, granting the request to use the software on the second IC design; and
in response to the classifier determining that the second IC design is not the same as the first IC design,
allowing the software to be used on the second IC design,
encrypting output of the software, and
forwarding a request to decrypt the output of the software to an arbiter.

15. The apparatus of claim 14, wherein the instructions when executed causing the processor to, prior to receiving the request to use the software on the second IC design:
extract multiple sets of values for the set of features of the first IC design when the software is used on the first IC design; and
train the classifier using the multiple sets of values for the set of features.

16. The apparatus of claim 15, wherein the training the classifier using the multiple sets of values for the set of features comprises constructing probability distribution functions for the set of features based on the multiple sets of values.

17. The apparatus of claim 14, wherein the instructions when executed causing the processor to:
in response to receiving a response from the arbiter which allows decryption of the output of the software to grant the request to use the software on the first IC design, decrypt the output of the software, and
grant the request to use the software on the first IC design.

* * * * *